(No Model.)
T. A. EDISON.
ELECTRICAL TRANSMISSION OF POWER.
No. 370,127. Patented Sept. 20, 1887.
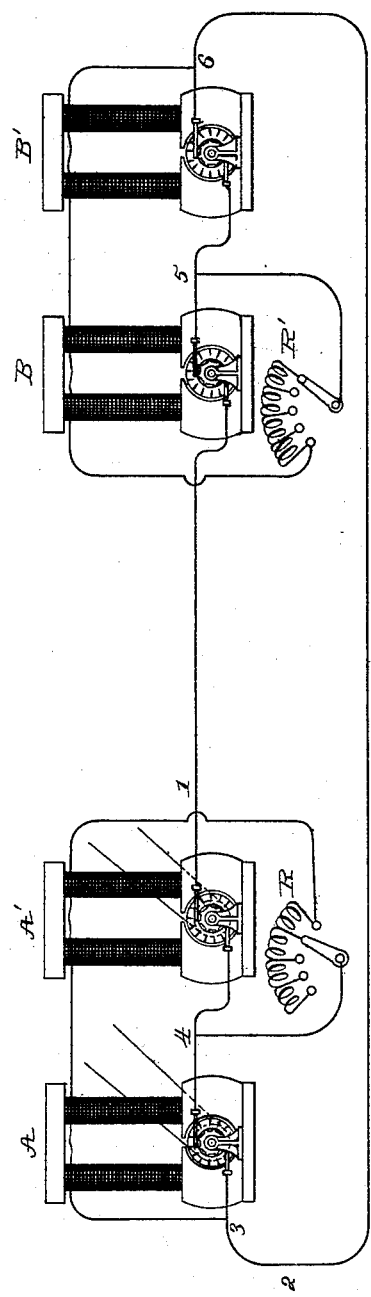
ATTEST:
E. C. Rowland
H. W. Seely
INVENTOR:
Thomas A. Edison,
By Rich'd N. Dyer,
Atty.

UNITED STATES PATENT OFFICE.

UNITED STATES PATENT OFFICE.

THOMAS A. EDISON, OF MENLO PARK, NEW JERSEY.

ELECTRICAL TRANSMISSION OF POWER.

SPECIFICATION forming part of Letters Patent No. 370,127, dated September 20, 1887.

Application filed June 7, 1883. Serial No. 97,327. (No model.)

*To all whom it may concern:*

Be it known that I, THOMAS A. EDISON, of Menlo Park, in the county of Middlesex and State of New Jersey, have invented a new and useful Improvement in Electrical Transmission of Power, (Case No. 569,) of which the following is a specification.

My invention relates to the running of two or more electro-dynamic motors mechanically independent of one another and connected electrically in series from a source of supply consisting of dynamo-electric machines also connected in series, and has for its object to enable all such motors to be regulated simultaneously and from a common point, to regulate all the generators simultaneously, so as to keep the generation of current proportioned to the amount utilized by the motors, and to enable the field-magnets of the motors and of the generators to be charged by currents of low electro-motive force, whereby coarse wire may be employed for the field-windings, and the danger of injury to such coils, which occurs with high-tension currents, is avoided. I accomplish this by placing the motors in series in the main circuit from the generators, and their fields in series in a shunt around one of the motors. Such shunt is provided with means for regulating the current flowing in it, and so regulating simultaneously the current supplied to the fields of all the motors. The generators are arranged in a similar manner with an adjustable resistance or other means for regulating their fields simultaneously. Thus, when the motors are regulated by reducing the current in their fields, so that less current is required to operate them, the generators, also, are correspondingly regulated, so that they supply only the proper amount of current, and when one or more motors are removed from operation the generators are regulated so as to supply only enough current to those remaining in use. By shunting all the fields of the generators and all the fields of the motors around a single generator or motor, respectively, such fields are supplied with currents of low electro-motive force or tension. Of course with a very large number of generators or motors the fields may be shunted around two or any other small part of the whole series of the machines, which arrangement is evidently equivalent for the purpose mentioned. This arrangement is illustrated diagrammatically in the accompanying drawing.

A A' are dynamo-electric machines connected in series, and 1 2 are the main-circuit conductors extending from the series of generators. The feeders of both generators are in a shunt-circuit, 3 4, around the generator A, such shunt containing an adjustable resistance, R.

B B' are electro-dynamic motors connected in series. Their fields are in a shunt-circuit, 5 6, around the motor B'. The motors, while independent in operation, may thus be regulated simultaneously by means of the adjustable resistance R' in the shunt-circuit 5 6, which resistance controls the fields of all the motors.

What I claim is—

1. The combination, with two or more dynamo-electric machines arranged in series, of a shunt around one of said machines, including the field-magnet coils of all said machines, and means for regulating the current in said shunt, substantially as set forth.

2. The combination, with two or more dynamo-electric generators arranged in series and having their field-magnet coils in series in a shunt around one of them, and means for regulating the current in said shunt, of two or more electro-dynamic motors arranged in series connected with said generators, having their field-magnet coils in series in a shunt around one of them, and means for regulating the current in said shunt, substantially as set forth.

This specification signed and witnessed this 1st day of June, 1883.

THOS. A. EDISON.

Witnesses:
 H. W. SEELY,
 EDWARD H. PYATT.